(12) United States Patent
Hayakawa et al.

(10) Patent No.: US 7,926,826 B2
(45) Date of Patent: Apr. 19, 2011

(54) LOAD SENSOR DEVICE AND STEERING APPARATUS FOR VEHICLE HAVING THE SAME

(75) Inventors: Hideyuki Hayakawa, Nishio (JP); Kenji Morikawa, Hekinan (JP)

(73) Assignee: Denso Corporation, Kariya (JP)

( * ) Notice: Subject to any disclaimer, the term of this patent is extended or adjusted under 35 U.S.C. 154(b) by 140 days.

(21) Appl. No.: 12/383,783

(22) Filed: Mar. 26, 2009

(65) Prior Publication Data

US 2009/0243245 A1 Oct. 1, 2009

(30) Foreign Application Priority Data

Mar. 28, 2008 (JP) ................................. 2008-087937

(51) Int. Cl.
*B62D 6/00* (2006.01)
(52) U.S. Cl. .................... 280/93.5; 280/89.1; 280/89.12; 280/93.512; 180/410; 180/421
(58) Field of Classification Search .................... 280/89, 280/89.1, 89.12, 93.512, 93.509, 86.757, 280/86.758, 771, 93.5; 180/410, 415, 421, 180/422; 73/862.046, 777; 29/825
See application file for complete search history.

(56) References Cited

U.S. PATENT DOCUMENTS

| | | | | |
|---|---|---|---|---|
| 6,032,757 | A * | 3/2000 | Kawaguchi et al. | 180/446 |
| 6,543,570 | B2 * | 4/2003 | Parker | 180/446 |
| 6,842,678 | B2 * | 1/2005 | Husain et al. | 701/41 |
| 6,871,717 | B2 * | 3/2005 | Kada | 180/167 |
| 6,929,086 | B1 * | 8/2005 | Husain et al. | 180/413 |
| 6,976,555 | B2 * | 12/2005 | Husain et al. | 180/443 |
| 7,405,557 | B2 * | 7/2008 | Spratte et al. | 324/207.22 |
| 7,508,148 | B2 * | 3/2009 | Kanda | 318/432 |
| 7,552,653 | B2 * | 6/2009 | Steinkamp et al. | 73/862.22 |
| 7,708,108 | B2 * | 5/2010 | Miyasaka et al. | 180/402 |
| 2005/0103124 | A1 * | 5/2005 | Asai et al. | 73/862.046 |
| 2005/0193828 | A1 * | 9/2005 | Morikawa | 73/777 |
| 2008/0271942 | A1 * | 11/2008 | Yamashita et al. | 180/443 |

(Continued)

FOREIGN PATENT DOCUMENTS

JP 11-37860 2/1999

(Continued)

OTHER PUBLICATIONS

Masaaki Chiga, Steering Control Device for Vehicle, Nov. 24, 1999, JPO, JP 11-321685 A, Machine translation of Description.*

(Continued)

*Primary Examiner* — Paul N Dickson
*Assistant Examiner* — James English
(74) *Attorney, Agent, or Firm* — Harness, Dickey & Pierce, PLC

(57) ABSTRACT

A wheel-side end of a connection link is freely inclined relative to the wheel. A shaft-side end of the connection link is movable substantially in a width direction of the vehicle for steering the wheel. A steering shaft body is substantially in a rod shape extending substantially in the width direction. A steering shaft end is fixed to one end of the steering shaft body and freely inclined relative to the shaft-side end. The steering shaft body and the steering shaft end are movable substantially in the width direction according to an operation of a steering device. A load sensor is interposed between the steering shaft end and the steering shaft body for detecting load applied in an axial direction of the steering shaft to detect force applied to the wheel.

9 Claims, 3 Drawing Sheets

U.S. PATENT DOCUMENTS

2009/0097791 A1 * 4/2009 Ozaki et al. .................. 384/448
2009/0235760 A1 * 9/2009 Hayakawa et al. ...... 73/862.046
2009/0241690 A1 * 10/2009 Hayakawa et al. ...... 73/862.046

FOREIGN PATENT DOCUMENTS

| | | |
|---|---|---|
| JP | 11-321685 | 11/1999 |
| JP | 2002-173044 | 6/2002 |
| JP | 2005-81924 | 3/2005 |
| JP | 2005-172793 | 6/2005 |
| JP | 2005-249598 | 9/2005 |
| JP | 2006-056374 | 3/2006 |
| JP | 2007-145040 | 6/2007 |
| JP | 2007-261511 | 10/2007 |

OTHER PUBLICATIONS

Suzuki et al., Load Detecting Device, Feb. 12, 1999, JPO, JP 11-037860 A, Machine translation of Description.*

Suzuki et al., Load Detecting Device, Feb. 12, 1999, JPO, JP 11-037860 A, English Abstract.*

Office action dated Mar. 2, 2010 in corresponding Japanese Application No. 2008-087937.

Office action dated Jul. 29, 2010 in corresponding Japanese Application No. 2008-087937.

* cited by examiner

LOAD SENSOR DEVICE AND STEERING APPARATUS FOR VEHICLE HAVING THE SAME

CROSS REFERENCE TO RELATED APPLICATIONS

This application is based on and incorporates herein by reference Japanese Patent Application No. 2008-87937 filed on Mar. 28, 2008.

FIELD OF THE INVENTION

The present invention relates to a load sensor device. The present invention further relates to a steering apparatus for a vehicle having the load sensor device.

BACKGROUND OF THE INVENTION

For example, JP-A-2006-56374 and JP-A-2007-145040 disclose methods for measurement of force applied to a steered wheel of a vehicle. According to JP-A-2006-56374, a vehicle steering apparatus includes an auxiliary steering unit, a going-straight determination unit, an applied force calculating unit, and a steering control unit. The auxiliary steering unit is provided to each end of a steering shaft, which is used for independently manipulating right and left steered wheels of a vehicle according to an operation of a steering device. The applied force calculating unit calculates a difference between values of force caused in accordance with a road surface and applied to both steered wheels. The going-straight determination unit determines whether the vehicle goes straight in a running state. The steering control unit operates the auxiliary steering unit so as to control steering of at least one of the steered wheels when the going-straight determination unit determines that the vehicle goes straight, and the difference between the values of force applied to the right and left steered wheels calculated by the applied force calculating unit is larger than a predetermined value. Thus, the vehicle steering apparatus controls the steering in accordance with the force applied to the steered wheels. The force applied to the steered wheels is obtained by detecting axial force applied to a member, which is movable independently from a rack bar such as a tie rod or an auxiliary rack bar mechanism.

JP-A-2007-145040 discloses an electric steering device, which includes a load detecting unit and a steering power control unit. The load detecting unit includes a steering mechanism, which is connected with right and left steered wheels for steering the steered wheels, an electric actuator, which supplies steering power to the steering mechanism, a right load sensor, which detects load applied from the right steered wheel to the steering mechanism in the direction of the load, a left load sensor, which detects load applied from the left steered wheel to the steering mechanism in the direction of the load. The steering power control unit actuates the electric actuator based on at least a detection signal of the two right and left load sensors. The electric steering device further includes a sensor malfunction detection unit for determining whether the load detecting unit causes a malfunction by comparing the detection signal of the left load sensor with the detection signal of the right load sensor. The electric steering device controls steering assist in accordance with the force applied to the steered wheels. The force applied to the steered wheels is obtained by detecting the axial force applied to the tie rod.

According to JP-A-2006-56374 and JP-A-2007-145040, the force applied to the steered wheels is obtained by detecting the force applied to a device such as the tie rod and the auxiliary rack bar mechanism in the axial direction. The axial direction of the device such as the tie rod changes according to a steering state of the steered wheel. Here, self aligning torque (SAT) applied to each steered wheel may be detected so as to obtain a coefficient of friction of a road surface and the like. Specifically, a tire is applied with force (SAT) in the steering direction according to a slip angle and the like. The SAT changes in accordance with the slip angle of the tire, the coefficient of friction of the road surface, a running state, and the like. Therefore, the coefficient of friction of the road surface can be obtained by detecting the slip angle, the SAT, and the like. However, in the conventional method, in which the force applied to the device such as the a rod 93 in the axial direction is detected, the SAT may not be obtained with sufficient accuracy.

SUMMARY OF THE INVENTION

In view of the foregoing and other problems, it is an object of the present invention to produce a load sensor device configured to detect force such as self aligning torque (SAT) applied to steered wheels with sufficient accuracy when being used for a steering apparatus. It is another object of the present invention to produce the steering apparatus.

As shown in FIG. 7, self aligning torque (SAT) is applied in a rotative direction in which a tire 90 is steered. The SAT is transmitted via a knuckle arm 94, the tie rod 93, and a rack end 92 to a rack 91. The knuckle arm 94 is rotatable relative to the suspension arm, and the SAT is caused as torque around the knuckle arm 94. The SAT is caused by force applied to a connection between the knuckle arm 94 and the tie rod 93 in the width direction of the vehicle. Therefore, the SAT can be obtained with sufficient accuracy by detecting the force F2 in the width direction of the vehicle. In the conventional method, in which the force applied to the device such as the tie rod 93 in the axial direction is detected, the SAT may not be obtained with sufficient accuracy. Specifically, as shown in FIG. 8, the tie rod 93 is inclined by an inclination angle θ relative to the width direction of the vehicle. So as to calculate the SAT with sufficient accuracy, the force applied to the device in the axial direction needs to be corrected according to the inclination angle θ. However, the inclination angle θ largely changes in response to the running state. Therefore, it is hard to correct the force according to the inclination angle θ. In a common vehicle, fluctuation in inclination angle θ caused by the up-and-down motion is large. In addition, the inclination angle θ of the tie rod 93 complicatedly changes in response to the up-and-down motion of the vehicle, the steering angle of the tire 90, and the like. Therefore, it is hard to or complicated to calculate the inclination angle θ with sufficient accuracy.

According to one aspect of the present invention, a load sensor device for a steering apparatus for detecting force applied to a wheel of a vehicle; the steering apparatus including a connection link having a wheel-side end, which is connected with the wheel and freely inclined relative to the wheel, and an shaft-side end, which is movable substantially in a width direction of the vehicle for steering the wheel. The steering apparatus further including a steering shaft including a steering shaft body, which is substantially in a rod shape extending substantially in the width direction of the vehicle, and a steering shaft end, which is fixed to one end of the steering shaft body and connected to the shaft-side end of the connection link, the steering shaft end being freely inclined relative to the shaft-side end, the steering shaft being movable substantially in the width direction according to an operation of a steering device. The load sensor device comprises a load sensor interposed between the steering shaft end and the steering shaft body and configured to detect load applied in an axial direction of the steering shaft.

According to another aspect of the present invention, a steering apparatus for a vehicle, the steering apparatus comprises a connection link having a wheel-side end, which is connected with a wheel and freely inclined relative to the wheel, and an shaft-side end, which is movable substantially in a width direction of the vehicle for steering the wheel. The steering apparatus further comprises a steering shaft including a steering shaft body, which is substantially in a rod shape extending substantially in the width direction of the vehicle, a steering shaft end, which is fixed to one end of the steering shaft body and connected to the shaft-side end of the connection link and freely inclined relative to the shaft-side end, the steering shaft being movable substantially in the width direction according to an operation of a steering device. The steering apparatus further comprises a load sensor interposed between the steering shaft end and the steering shaft body and configured to detect load applied in an axial direction of the steering shaft for detecting force applied to the wheel of the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Construction

As follows, a construction and a structure of a load sensor according to the present embodiment will be described. A load sensor according to the present embodiment is used for a steering apparatus of a vehicle. The load sensor is configured to detect change in load, which corresponds to force applied to a steered wheel in steering apparatus. In particular, the load sensor is used for measurement of self-aligning torque (SAT). According to the present embodiment, the load sensor can be used for any one of a front wheel and a rear wheel. For example, in a four-wheel steering vehicle (4WS vehicle), a steering apparatus is provided to each of the front wheels and the rear wheels. In such a 4WS vehicle, the present load sensor may be applied to both the front and the rear wheels and may be applied to the front wheels or the rear wheels.

Figure 1:
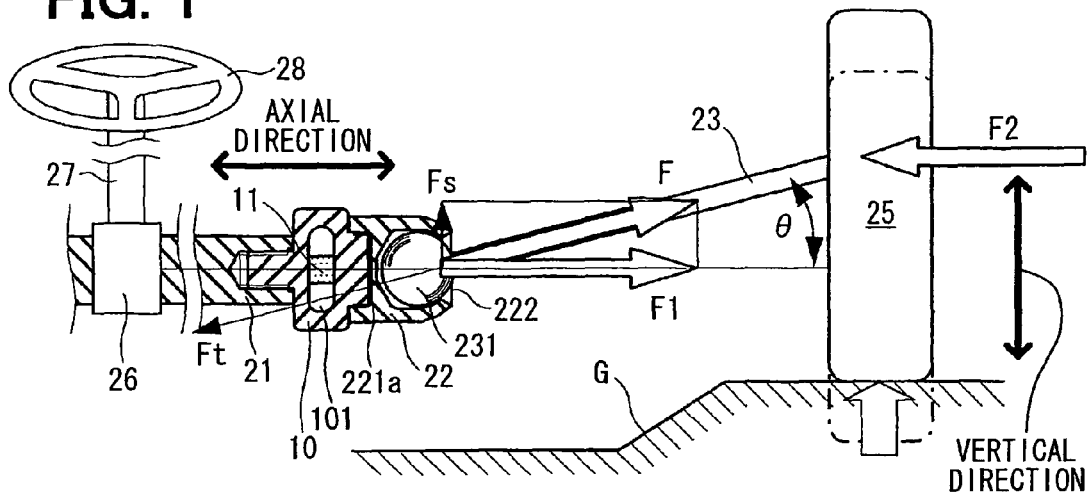
FIG. 1 is a schematic sectional view showing a load sensor used in a vehicle when being viewed from the rear side of the vehicle, according to an embodiment.
Figure 2:
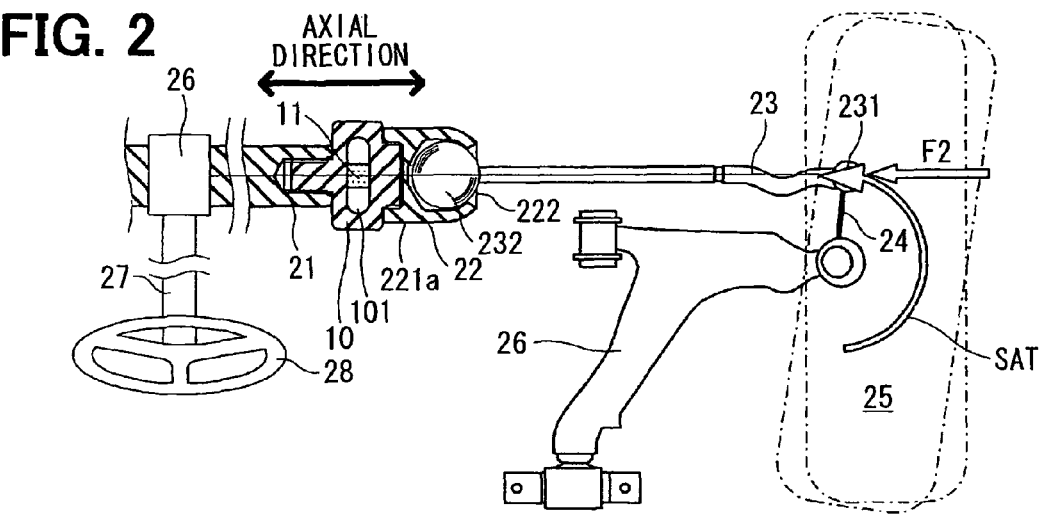
FIG. 2 is a schematic sectional view showing the load sensor when being viewed from the upper side of the vehicle, according to the embodiment.
Figure 3:
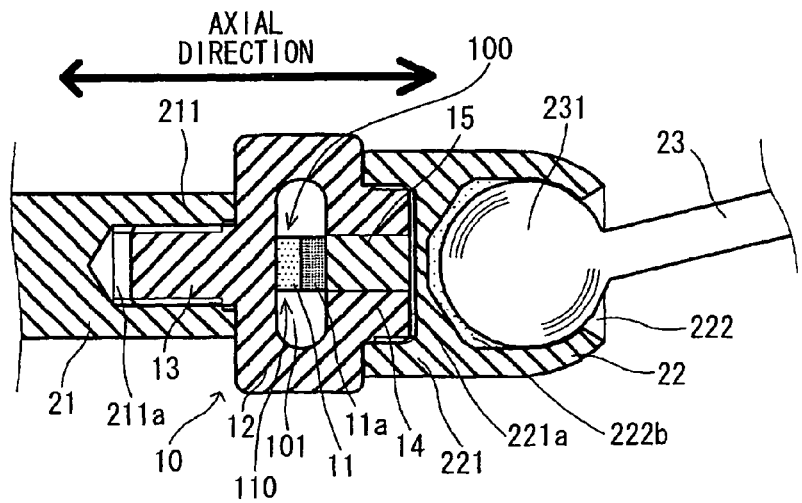
FIG. 3 is an enlarged sectional view showing the load sensor according to the embodiment.

As shown in FIGS. 1 to 3, the load sensor 10 according to the present embodiment is interposed between a rack 21 (steering shaft body) and a rack end (steering shaft end) 22. More specifically, the load sensor 10 is interposed between one end 211 of the rack 21 and the one end 221 of the rack end 22. The rack 21 functions as a steering shaft. According to the present structure, load applied between the rack 21 and the rack end 22 is entirely transmitted to the load sensor 10. FIG. 1 depicts only components at the right side of the vehicle. In FIG. 1, depiction of components of the vehicle at the left side is omitted. The components of the vehicle at the left side are substantially equivalent to the components at the right side.

The load sensor 10 has a load sensor body portion 12 as a structural member. The load sensor body portion 12 has an opening 101 as an inner space provided with the load detection element 11. The opening 101 extends in the vertical direction in FIG. 1 and the perpendicular direction to the sheet surface of FIG. 1. That is, the opening 101 has the height and width. The inner peripheries defining the opening 101 in the load sensor body portion 12 therebetween interpose the load detection element 11. The load detection element 11 is in contact with the inner peripheries of the opening 101 in the width direction of the vehicle. According to the present structure, the load applied to the load detection element 11 in the width direction of the vehicle is larger than the load applied to the load detection element 11 in other directions than the width direction. Therefore, sensitivity of the load applied in the width direction of the vehicle is higher than sensitivity of the load applied in the other directions. In particular, the opening 101 extends in the direction perpendicular to the width direction of the vehicle and has the large length. In the present structure, the load sensor body portion 12 is easily deformed when being applied with load in the width direction of the vehicle, compared with a case where the load sensor body portion 12 is applied with load from the other directions than the width direction of the vehicle. Therefore, the load sensor body portion 12 effectively transmits load applied in the width direction to the load detection element 11.

The load detection element 11 is applied with preload. Sensitivity of the load detection element 11 in the sharing direction is substantially ignorable relative to sensitivity in the compression direction. Therefore, the load detection element 11 is capable of regularly and selectively measuring load in the compression direction, as long as a load application portion does not float or slide on the surface of the load detection element 11. Further, by applying the preload, the load detection element 11 is capable of detecting load in the tensile direction in addition to the load in the compression direction. Thus, the SAT applied to a tire of the steered wheel at each of the right and left sides can be regularly detected, since force in the tensile direction can also be detected by applying the preload. Thereby, the coefficient of friction on the contact surface of each tire can be regularly detected. The preload may be arbitrary applied to the load detection element 11. For example, the preload may be applied by utilizing elastic deformation caused in the load sensor body portion 12. For example, as shown in FIG. 3, the load sensor body portion 12 and a mounting member 14 may be provided with a hole, which extends in the mounting member 14 in the width direction of the vehicle. A preload application member 15 is press-fitted or screwed into the hole so as to urge the load detection element 11 at the tip end, and hereby the preload can be adjusted. A buffer member 11a is interposed between the preload application member 15 and the load detection element 11. By interposing the buffer member 11a, a difference in coefficient of thermal expansion between materials of the components of the load sensor 10 can be compensated, and thereby thermal expansion caused in the components of the load sensor 10 can be absorbed.

Figure 4A:
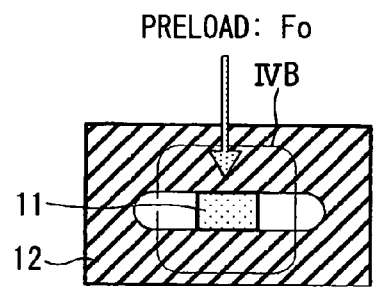
FIG. 4A is a sectional view showing the load sensor to which force and preload are applied.
Figure 4B:
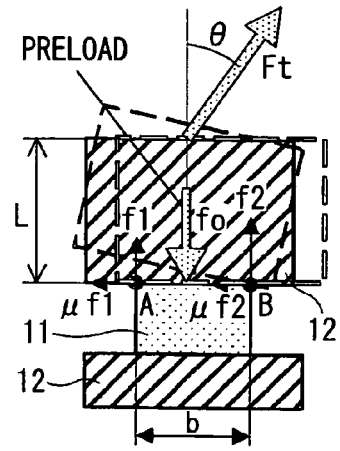
FIG. 4B is an enlarged view of FIG. 4A, according to the embodiment.

The preload may be determined such that the load detection element 11 and the inner periphery defining the opening 101 do not separate from each other or do not slide relative to each other when load is applied in the tensile direction or in a direction in which the load detection element 11 is bent. As follows, an example of application of the preload will be described with reference to FIGS. 4A, 4B. In FIGS. 4A, 4B, the preload Fo is applied to the load detection element 11, which has the width b. The inner periphery of the load sensor body portion 12, which is in contact with the load detection element 11, and the outer periphery of the load sensor body portion 12 are distant from each other by the thickness L. External force Ft is applied to the load sensor body portion 12 of the load sensor 10 in a direction at an angle θ with respect to the axial direction. Force f1 is caused by the external force Ft in the end of the load detection element 11 at the left side in the direction of the width b in FIG. 4. Force f2 is caused by the external force Ft in the end of the load detection element 11 at the right side in the direction of the width b in FIG. 4. Components of force (f1+f2) and (Fo−Ft·αy·cos θ) are caused between the load detection element 11 and the inner periphery of the opening 101 of the load sensor body portion 12 in the vertical direction X in FIGS. 4A, 4B. Components of force μ(f1+f2) and (Ft·αx·sin θ) are caused between the load detection element 11 and the inner periphery of the opening 101 in the lateral direction Y in FIGS. 4A, 4B. In addition, components of moment (L·Ft·αx·sin θ+b·f2) and (Fo−Ft·αy·cos θ)·b/2 are caused. The αx is an element load assignment rate in the vertical direction X in FIGS. 4A, 4B, and αy is an element load assignment rate in the lateral direction Y in FIGS. 4A, 4B. Each element load assignment rate is in a range of 0 to 1. The load sensor 10 is applied with the load, which is the product of the element load assignment rate and the load applied to the load detection element 11. According to the present assumption, the load detection element 11 and the inner periphery defining the opening 101 do not separate from each other when the preload Fo is set at Fo1, which is larger than (2 L·αx·sin θ/b+αx·cos θ)·Ft. The load detection element 11 and the inner periphery defining the opening 101 do not slide relative to each other when the preload Fo is set at Fo2, which is larger than (αx·sin θ/μ+αy·cos θ)·Ft. In consideration of vertical and horizontal inclination, the preload Fo is set at Fot, which is equal to $(Fo1^2+Fo2^2)^{0.5}$. As the width b of the load detection element 11 becomes large, the required preload Fot becomes gradually small. Therefore, the width b of the load detection element 11 is preferably large.

The load detection element 11 includes a pair of element-structural members 110 and a pressure-sensitive element 100. Each of the element-structural members 110 is formed from an insulative material. The pressure-sensitive element 100 is substantially in a film shape and interposed between the element-structural members 110. The insulative materials of the element members are preferably ceramic materials such as alumina ($Al_2O_3$) having high rigidity. The element members 11, 12 may be formed from at least one of zirconia ($ZrO_2$), $MgAl_2O_4$, $SiO_2$, $3Al_2O_3.2SiO_2$, $Y_2O_3$, $CeO_2$, $La_2O_3$, $Si_3N_4$, and the like. Alternatively, the element members 11, 12 may be formed from a metallic material or the like and covered with at least one of the above insulative materials of zirconia ($ZrO_2$), $MgAl_2O_4$, $SiO_2$, $3Al_2O_3.2SiO_2$, $Y_2O_3$, $CeO_2$, $La_2O_3$, $Si_3N_4$, and the like to be electrically insulative.

It suffices that the pressure-sensitive element 100 is formed from a material, which changes in electrical property according to a load applied from the outside. For example, the pressure-sensitive element 100 may be formed from a composite material formed from glass as a matrix and electrically conductive particles, which are distributed in the matrix. The matrix of the pressure-sensitive element 100 may be formed from borosilicate glass, for example. The conductive particles of the pressure-sensitive element 100 may be formed from ruthenium oxide ($RuO_2$), lead ruthenate, or the like. The conductive particles may be preferably formed from ruthenium oxide.

The outer circumferential periphery of the load sensor 10 defines thread grooves. The load sensor 10 has mounting members 13, 14 each extending substantially in the axial direction of the rack 21. The rack 21 has the one end 211, which has a mounting portion 211a. The inner circumferential periphery of the mounting portion 211a defines thread grooves screwed with the mounting member 13. The rack end 22 has one end 221, which has a mounting portion 221a. The inner circumferential periphery of the mounting portion 221a defines thread grooves screwed with the mounting member 14. The mounting portions 221a, 222a of the rack 21 and rack end 22 are respectively screwed to the mounting members 13, 14, and thereby the load sensor 10 is interposed and fixed between the rack 21 and the rack end 22. The load sensor 10 may be fixed between the rack 21 and the rack end 22 by screwing, press-fitting, welding, or the like. The rack end 22 has the other end 222, which forms a ball joint with one end (shaft-side end) 232 of a tie rod 23. The other end 222 of the rack end 22 therein has a ball bearing 222b, which is formed from resin, for example. The other end (wheel-side end) 231 of the tie rod 23 is connected with a knuckle arm 24 via a connection joint (not shown).

The rack 21 has an intermediate portion in the width direction, and the intermediate portion has a rack-and-pinion mechanism 26, which converts a motion of the rack 21 in the width direction to the rotation of a steering shaft 27 and vice versa. One end of the steering shaft 27 is connected with the rack-and-pinion mechanism 26. A steering device 28 is fixed to the other end of the steering shaft 27.

In the present structure, the rack 21 moves in the width direction according to an operation of the steering device 28. Rotation of the steering device 28 is transmitted to the steering shaft 27, and thereby the rotation is converted to movement of the rack 21 in the width direction by the rack-and-pinion mechanism 26. Thus, the knuckle arm 24 is manipulated via the rack end 22 and the tie rod 23, and thereby a tire 25 (steered wheel) is steered.

(Operation Effect)

As follows, an operation effect of the present load sensor 10 will be described. In the present example, the load sensor 10 is provided to detect SAT applied to the tire 25. The tire 25 is applied with SAT due to various reasons. For example, the SAT changes according to various factors such as a slip angle of the tire 25, a coefficient of friction of a road surface, and a running state of the vehicle.

As show in FIG. 2, the SAT acts to steer the tire 25 so as to direct the tire 25 in a straight direction. The coefficient of friction of the road surface can be detected in accordance with the SAT with sufficient accuracy in a range in which the tire 25 is directed around the straight direction. The SAT caused in the tire 25 can be detected in accordance with the force F2 in the width direction of the vehicle. The force F2, which corresponds to the SAT, is transmitted to the rack 21 via the knuckle arm 24, the tie rod 23, and the rack end 22. The load sensor 10 according to the present embodiment is interposed between the rack 21 and the rack end 22. Therefore, the load sensor 10 is capable of detecting the transmitted force.

According to the present structure, the load sensor 10 has high sensitivity in the axial direction of the rack 21, which is substantially in parallel with the width direction of the vehicle. Therefore, the load sensor 10 is capable of detecting a component of the moment applied to the rack 21 in the axial direction of the rack 21. The SAT corresponds to the load applied to the tire 25 in the width direction of the vehicle. For example, as shown in FIG. 1, force F2 occurs correspondingly to the SAT, and thereby the tie rod 23 is applied with force F. The force F is divided into components of force F1 in the width direction and force Fs, which is perpendicular to the force F1. The force F1 and the force F2 are in the same direction.

Force applied from the knuckle arm 24 to the load sensor 10 is transmitted via the tie rod 23. As shown in FIG. 2, inclination of the tie rod 23 largely varies in the upper and lower directions and forward and backward directions. The load applied from the knuckle arm 24 to the other end 231 of the tie rod 23 has a component of force in the width direction of the vehicle, which corresponds to the direction of the SAT. The component of force in the width direction is applied to the rack end 22 in the width direction of the vehicle. According to the present embodiment, the load sensor 10 has high sensitivity in the width direction of the vehicle, and thereby the load applied to the rack 21 in the width direction can be measured with high accuracy.

In FIGS. 4A, 4B, the load sensor 10 has the body portion 12 therein defining the opening 101 (FIG. 3) in which the load detection element 11 is provided. The opening 101 is an elongated hole extending perpendicularly to the vertical direction in FIGS. 4A, 4B in which the load is applied to the load detection element 11. The opening 101 has the width in the lateral direction perpendicular to the vertical direction in which the load is applied, and the width is larger than the height of the opening 101 in the vertical direction. According to the present structure, the rigidity of the body portion 12 in the vertical direction, in which the load is applied to the body portion 12, is lower than the rigidity of the body portion 12 in other directions.

In FIGS. 4A, 4B, the upper surface of the inner space of the body portion 12 and the lower space of the inner space of the body portion 12 therebetween interpose the load detection element 11 in an interposing direction. In the present structure, the rigidity of the body portion 12, which transmits the load to the load detection element 11, in the interposing direction is smaller than the rigidity of the body portion 12 in other directions than the interposing direction. In the present structure, influence to detection of the load sensor caused by load applied from the other direction can be reduced. Thus, the load applied in the interposed direction can be selectively and accurately detected.

(First Modification)

Figure 5:
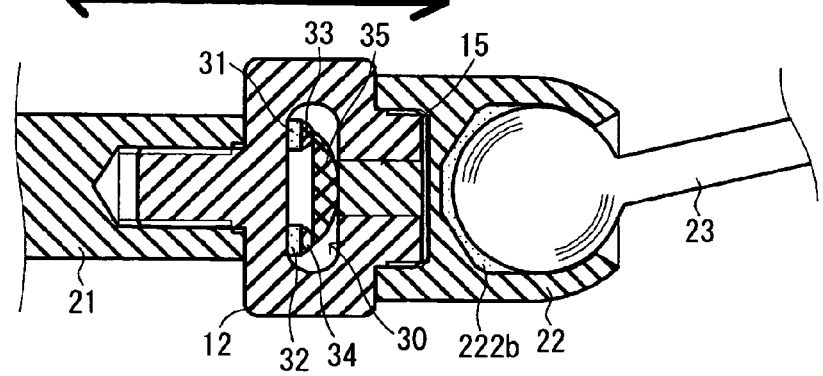
FIG. 5 is an enlarged sectional view showing a load sensor according to a first modification.

According to the present first modification, as shown in FIG. 5, a load detection element 30 has a structure similar to the structure of the load detection element 11 in the above embodiment. The load detection element 30 includes elements 31, 32, buffer members 33, 34, and a bridge member 35. Each of the elements 31, 32 is substantially in a rectangular shape in cross section, and the axial direction of each element 31, 32 is directed toward the opening 101. Each of the buffer members 33, 34 is substantially in a convex shape in cross section and stacked on corresponding one of the elements 31, 32 in the width direction of the vehicle. Each of the buffer members 33, 34 has a flat surface, which is in contact with corresponding one of the elements 31, 32. The bridge member 35 is substantially in a convex shape in cross section and has a flat surface. The bridge member 35 is supported by the convex sides of the buffer members 33, 34 via lateral ends of flat surface in the width direction. The convex side of the bridge member 35 is in contact with the preload application member 15. Thereby, a dimensional tolerance of the components can be easily absorbed, and the contact surfaces of the components can be fitted with each other. The convex side of the bridge member 35 may be in contact with the inner periphery of the opening 101. The buffer members 33, 34 may be formed from a material different from materials of other components, and thereby difference in thermal expansion among components can be compensated, and thermal expansion caused in the components can be absorbed. For example, the surface of the elements 31, 32 may be formed from alumina, the load sensor body portion 12 and the bridge member 35 may be formed from carbon steel, and the buffer members 33, 34 may be formed from stainless steel. The coefficients of linear expansion of alumina, carbon steel (S35C, SCM435), and stainless steel (SUS304, SUS305) are respectively about $7.2 \times 10^{-6}/°$ C., $10.8-11.4 \times 10^{-6}/°$ C., and $17.3 \times 10^{-6}/°$ C. The summation of product of the thickness and the linear expansion coefficient of the elements 31, 32 and the load sensor body portion 12 is preferably the same as the summation of product of the thickness and the linear expansion coefficient of the buffer members 33, 34 and the bridge member 35. Thermal expansion caused in the buffer members 33, 34, the bridge member 35, and the elements 31, 32 and thermal expansion caused in the load sensor body portion 12 are preferably the same. Thereby, thermal expansion caused in the components can be negated, and thereby influence such as variation in load caused by thermal expansion can be reduced to a minimum. Further, the length equivalent to the width b of the load detection element 11 in the above embodiment can increased, and thereby application of the preload to apply can be reduced.

(Second Modification)

Figure 6:
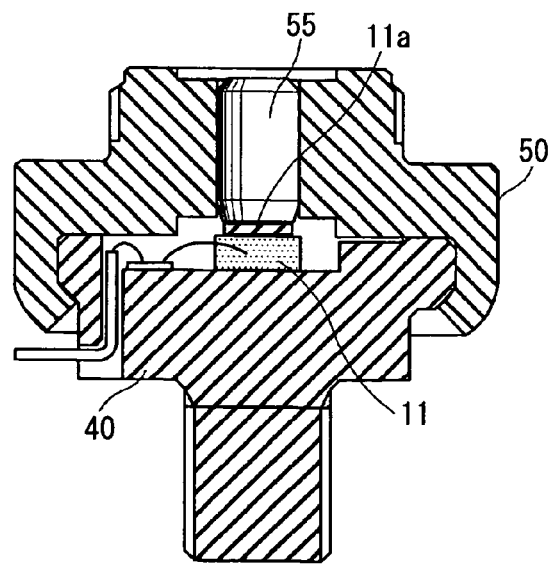
FIG. 6 is a sectional view showing a load sensor according to a second embodiment.

As shown in FIG. 6, according to the present second modification, a load sensor includes the load detection element 11, a structural member (body), a preload adjusting member 55, and the like. The structural member includes a first structural member 40 and a second structural member 50. In the present second modification, the structural member including the first structural member 40 and the second structural member 50, which are separate two components, are provided instead of the load sensor body portion 12 of the load sensor 10 according to the above embodiment. In the load sensor shown in FIG. 6, the second structural member 50 has a hole, which is press-fitted with the preload adjusting member 55, and thereby the preload applied to the load detection element 11 is adjusted. The buffer member 11a is interposed between a tip end of the preload adjusting member 55 and the load detection element 11. According to the present structure, the closed space can be formed to accommodate the load detection element 11, dissimilarly to the open space in the above embodiment.

(Third Modification)

In the above embodiment and the modifications, the rack 21 has rack ends 22 at both ends so as to steer both right and left steered wheels. Alternatively, the rack 21 may have one rack end 22 at only one end so as to steer only one of the right and left steered wheels. For example, in a mechanism, in which the steering angles of right and left steered wheels are independently controlled, a component, which is equivalent to the rack 21, may be provided to each of the right and left steered wheels for independently manipulating the right and left steered wheels in the width direction. In this case, the SAT (load) applied to one of the steered wheels can be detected without influence caused by load applied from the other of the steered wheels, in principle.

Figure 7:
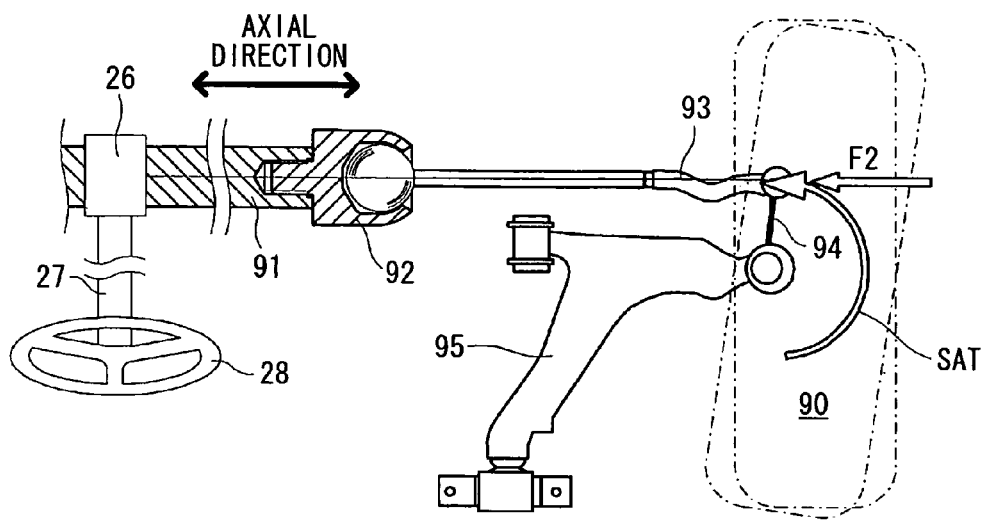
FIG. 7 is a schematic sectional view showing a load sensor used in a vehicle when being viewed from the rear side of the vehicle, according to a related art.
Figure 8:
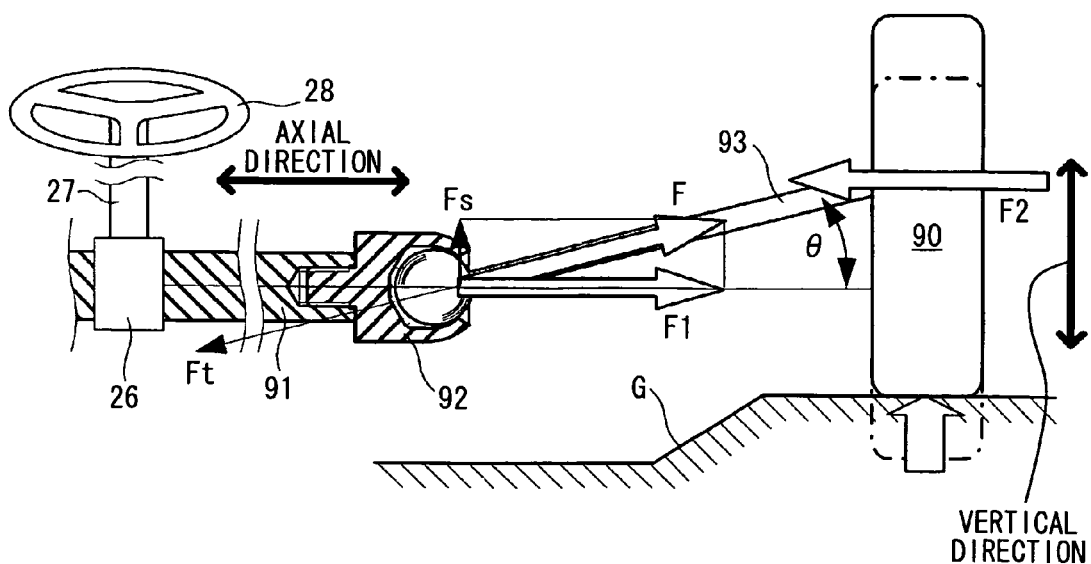
FIG. 8 is a schematic sectional view showing the load sensor when being viewed from the upper side of the vehicle, according to the related art.

According to the embodiments, the load sensor 10 is interposed between the steering shaft body 21 of the steering shaft 21, 22 and the steering shaft end 22, and thereby being capable of detecting the force (SAT) applied to the steered wheel with sufficient accuracy. The axial direction of the steering shaft 21, 22 substantially corresponds regularly to the width direction of the vehicle. The load sensor 10 is located such that the load in the axial direction of the steering shaft 21, 22 can be measured. In the present structure, the SAT can be detected substantially regardless of the inclination of the connection link 23 caused by the steering operation in FIG. 7. The steering shaft 21, 22 is equivalent to the rack 91 and the rack end 92 in FIG. 7. The connection link 23 is equivalent to the tie rod 93 in FIG. 7 and the like and may be a device, which is constructed by connecting two or more links. The inclination of the connection link 23 is equivalent to the inclination angle θ caused by the up-and-down motion of the wheel in FIG. 8. As shown in FIG. 7, the force F2, which is related to the SAT, is transmitted as the component F2 of the force in the width direction of the vehicle to the rack end 22 via the tie rod 93. Therefore, the force F2 can be detected with sufficient accuracy in the present structure in which the load sensor 10 is interposed between the rack end 22 and the rack 21 in the axial direction. The load sensor 10 is interposed between the steering shaft end 22 and the steering shaft body 21 and configured to detect load applied in the axial direction of the steering shaft 21, 22. Specifically, in the load sensor 10, the sensitivity of the load in the axial direction is sufficiently higher than the sensitivity of the load in the other directions. Alternatively, the load sensor 10 is capable of independently detecting the load applied in the axial direction. For example, the load sensor 10 is substantially capable of detecting only the load in the axial direction and substantially incapable of detecting the load applied in other directions than the axial direction.

According to the embodiments, the load sensor 10 may include the structural member, which applies the preload to the load detection element 11. Thereby, the load sensor 10 is capable of detecting the load in the tensile direction, in addition to the load in the compression direction. Thus, the load sensor 10 is capable of detecting the load in either the compression direction or the tensile direction with higher accuracy. Furthermore, in this case, problems such as separation of the structural member from the load detection element 11 and displacement between the structural member and the load detection element 11 can be restricted by setting the preload within a range in consideration of load to be applied to the load sensor 10.

According to the embodiments, the load sensor 10 may include the structural member, which has inner space, in which the load detection element 11 is provided. In the present structure, the rate of the load applied to the load detection element 11 to the load applied to this load sensor 10 can be arbitrarily determined. Specifically, the rate (load assignment rate) of the load transmitted to the load detection element 11 in the inner space can be arbitrarily determined by adjusting the rigidity of the structural member. For example, the rate of the load applied from the outside and transmitted to the load detection element 11 can be reduced by enhancing the rigidity of the structural member in the axial direction so as to reduce deformation caused in the inner space. Alternatively, the rate of the load applied from the outside and transmitted to the load detection element 11 can be increased by reducing the rigidity of the structural member in the axial direction so as to increase deformation caused in the inner space. Therefore, the rate of the load transmitted to the load detection element 11 can be adjusted according to the load detection range and application of the load to the load detection element 11.

According to the embodiments, multiple load detection elements 31, 32 may be provided side by side in the load sensor 10, and thereby the load applied to each load detection element 31, 32 according to the application assignment rate can be reduced. In addition, the length of a contact and interposed portion of the load detection element 30 via which the load detection element 30 is in contact with and interposed relative to the inner surface of the inner space of the body portion 12 can be increased by providing the bridge member 35. Therefore, the force applied to the contact and interposed portion in the rotative direction, in which the load detection element 30 is rotated and floated, can be absorbed.

According to the embodiment, the length of the inner space in the axial direction of the steering shaft 21, 22 may be smaller than the length of the inner space in the direction perpendicular to the axial direction of the steering shaft 21, 22. Thus, the body portion (structural member) 12 has rigidity in the compression direction, which is smaller than the rigidity in other directions than the compression direction.

Thus, deformation of the load sensor 10 in the compression direction can be enlarged compared with deformation in the sharing direction of the load sensor 10. Therefore, the force in the axial direction is significantly applied to the load sensor 10, and the force in other directions than the axial direction is hard to be applied to the load sensor 10. Thus, the force in the axial direction can be selectively detected. The force other than the compression direction is hard to be applied to the load detection element 11, and thereby the rigidity of the load detection element 11 in the other direction need not be enhanced, and therefore cost reduction can be achieved.

The above structures of the embodiments can be combined as appropriate. Various modifications and alternations may be diversely made to the above embodiments without departing from the spirit of the present invention.

What is claimed is:

1. A load sensor device for a steering apparatus for detecting force applied to a wheel of a vehicle, the steering apparatus including:
   a connection link having a wheel-side end, which is connected with the wheel and freely inclined relative to the wheel, and a shaft-side end, which is movable substantially in a width direction of the vehicle for steering the wheel; and
   a first steering shaft including a steering shaft body, which is substantially in a rod shape extending substantially in the width direction of the vehicle, and a steering shaft end, which is fixed to one end of the steering shaft body and connected to the shaft-side end of the connection link, the steering shaft end being freely inclined relative to the shaft-side end, the first steering shaft being movable substantially in the width direction according to an operation of a steering device,
   the load sensor device comprising:
   a load sensor interposed between the steering shaft end and the steering shaft body and configured to detect load applied in an axial direction of the first steering shaft, the load sensor including:

a load detection element applied with a preload in a compression direction in the axial direction of the first steering shaft; and a structural member having inner peripheries defining an inner space, which accommodates the load detection element, the load detection element has end portions interposed between the inner peripheries in the axial direction of the first steering shaft, the preload is set to be larger than $(\alpha x \cdot \sin\theta/\mu + \alpha y \cdot \cos\theta) \cdot Ft$, wherein Ft is an external force applied to the load sensor, $\theta$ is an inclination angle, at which the external force is applied, relative to the axial direction of the first steering shaft, $\alpha x$ is an element load assignment rate in the axial direction of the first steering shaft, $\alpha y$ is an element load assignment rate in a direction perpendicular to the axial direction of the first steering shaft, and $\mu$ is a coefficient of friction between the inner peripheries of the structural member and the load detection element.

2. The load sensor device according to claim 1, wherein the load detection element includes a plurality of elements, which are arranged in a direction perpendicular to the axial direction of the first steering shaft, and the load detection element further includes a bridge member via which the plurality of elements are interposed between the inner peripheries of the structural member.

3. The load sensor device according to claim 1, wherein the inner space has a first length in the axial direction of the first steering shaft, the inner space has a second length in a direction perpendicular to the axial direction of the first steering shaft, and the first length is smaller than the second length.

4. The load sensor device according to claim 1, wherein the structural member has rigidity in a compression direction in which the load detection element is compressed, and rigidity of the structural member in the compression direction is smaller than rigidity of the structural member in other directions.

5. The load sensor device according to claim 1, wherein the load detection element has a matrix, which is formed from glass, and conductive particles, which are distributed in the matrix and formed from $RuO_2$ having electrical conductivity, the load detection element includes a pressure-sensitive element, which changes in electrical property in response to application of stress, and insulative members, which are electrically insulative, and the insulative members are integrally formed respectively on two opposed surfaces of the pressure-sensitive element.

6. The load sensor device according to claim 1, wherein the steering device is fixed to a second steering shaft, which transmits manipulation of the steering device to the steering shaft body and configured to move the steering shaft body substantially in the width direction of the vehicle.

7. The load sensor device according to claim 1, further comprising:

a preload adjusting member inserted in the structural member for applying the preload to the load detection element.

8. A steering apparatus for a vehicle, the steering apparatus comprising:

a connection link having a wheel-side end, which is connected with a wheel and freely inclined relative to the wheel, and a shaft-side end, which is movable substantially in a width direction of the vehicle for steering the wheel;

a first steering shaft including a steering shaft body, which is substantially in a rod shape extending substantially in the width direction of the vehicle, a steering shaft end, which is fixed to one end of the steering shaft body and connected to the shaft-side end of the connection link and freely inclined relative to the shaft-side end, the first steering shaft being movable substantially in the width direction according to an operation of a steering device; and a load sensor interposed between the steering shaft end and the steering shaft body and configured to detect load applied in an axial direction of the first steering shaft for detecting force applied to the wheel of the vehicle, the load sensor including:

a load detection element applied with a preload in a compression direction in the axial direction of the first steering shaft; and a structural member having inner peripheries defining an inner space, which accommodates the load detection element, the load detection element has end portions interposed between the inner peripheries in the axial direction of the first steering shaft, the preload is set to be larger than $(\alpha x \cdot \sin\theta/\mu + \alpha y \cdot \cos\theta) \cdot Ft$, wherein Ft is an external force applied to the load sensor, $\theta$ is an inclination angle, at which the external force is applied, relative to the axial direction of the first steering shaft, $\alpha x$ is an element load assignment rate in the axial direction of the first steering shaft, $\alpha y$ is an element load assignment rate in a direction perpendicular to the axial direction of the first steering shaft, and $\mu$ is a coefficient of friction between the inner peripheries of the structural member and the load detection element.

9. A road surface friction coefficient calculation device for calculating a coefficient of friction of a road surface according to a self aligning torque of the wheel, a running state of the vehicle, and a slip angle of the wheel, the device comprising:

the load sensor according to claim 1, a self aligning torque calculation unit configured to calculate the self aligning torque of the wheel from the force detected by the load sensor;

a running state detection unit configured to detect the running state of the vehicle; and a slip angle detection unit configured to detect the slip angle of the wheel.

* * * * *